United States Patent [19]
Hohler

[11] 3,755,688
[45] Aug. 28, 1973

[54] ARRANGEMENT FOR SUPERVISING CIRCUITS

[75] Inventor: Albert Hohler, Kassel, Germany

[73] Assignee: U.S. Philips Corporation, New York, N.Y.

[22] Filed: Dec. 3, 1971

[21] Appl. No.: 204,487

[30] Foreign Application Priority Data
Dec. 19, 1970 Germany.................. P 20 62 788.7

[52] U.S. Cl.............. 307/117, 323/75 H, 323/75 K, 340/256
[51] Int. Cl. .......................................... G08b 21/00
[58] Field of Search................ 307/117, 75 H, 75 K; 323/75 H, 75 K; 331/65; 324/51; 340/256

[56] References Cited
UNITED STATES PATENTS
2,591,358  4/1952  Imlet................................ 323/75 H
2,673,960  3/1954  Doblmaier..................... 323/75 K
3,614,598  10/1971  Meyer............................... 323/75 H FOREIGN PATENTS OR APPLICATIONS
1,059,107  11/1959  Germany......................... 307/117

Primary Examiner—Herman J. Hohauser
Assistant Examiner—Morris Ginsburg
Attorney—Frank R. Trifari et al.

[57] ABSTRACT

Apparatus for monitoring thermocouples comprises a Wien Bridge Oscillator with the thermocouple connected as a part of the bridge. The oscillator parameters are chosen so that oscillations do not occur during normal operation of the thermocouple. The frequency of oscillations are determined by an RC-network. An indicating device is controlled by the output voltage of the oscillator.

7 Claims, 1 Drawing Figure

PATENTED AUG 28 1973 3,755,688
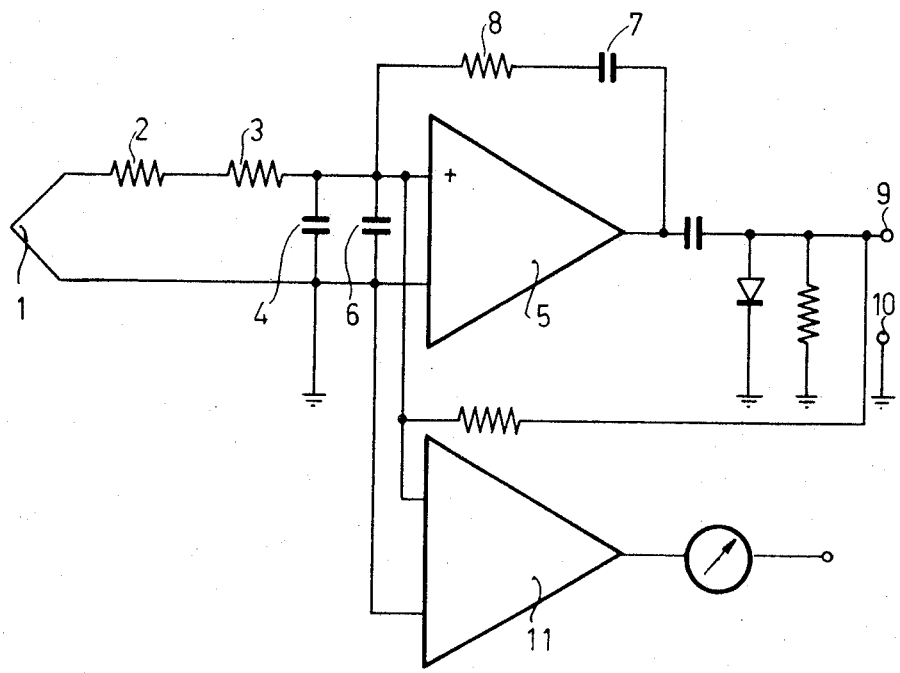
INVENTOR.
ALBERT HOHLER
BY
AGENT

ARRANGEMENT FOR SUPERVISING CIRCUITS

This invention relates to an arrangement for monitoring circuits, in particular for temperature-control devices and measuring converters using thermocouple sensors. An arrangement of this type generally comprises an oscillator which in normal operation does not oscillate and an indicating device which is controlled by an output voltage supplied by the oscillator in the case of a fault.

Such a circuit arrangement is described, for example, in German Pat. No. 1,059,107. In this arrangement the oscillator coil is provided with an additional short-circuit winding which, through a capacitance, is connected in parallel with the line part to be supervised. When the measuring circuit is closed, the oscillator is damped so heavily that it does not oscillate. When the circuit, for example, the thermocouple circuit, is broken, oscillations set in which, after rectification, produce a signal in the indicating circuit.

This arrangement, however, suffers from the disadvantage that the line capacitance may have widely different values which, depending on the type and the length of the cable, may range from less than 1 nanofarad to about 50 nonofarad. Undesirable resonance effects of the short-circuit winding with the line capacitance or resonances in the line itself may prevent the oscillator from starting in spite of the rupture of a thermocouple.

It is an object of the present invention to preclude such operational faults. This is achieved in that the oscillator is connected as an RC-generator and in that a capacitor-resistor network in the form of a Wien bridge the parallel branch of which is constituted by the measuring circuit is provided as the element which determines the frequency and the initiation of oscillation.

An embodiment of the invention will now be described, by way of example, with reference to the accompanying diagrammatic drawing, the single FIGURE of which shows a Wien Bridge Oscillator arrangement for supervising a thermocouple circuit.

Referring now to the FIGURE, a thermocouple 1 with an internal resistance 2 is connected through a line having an internal resistance 3 and a line capacitance 4 to the input terminals of an amplifier 5 of the Wien Bridge Oscillator. Together with an appropriately chosen capacitance 6 connected in parallel with the input terminals of the amplifier 5, this circuit forms the parallel branch of a Wien bridge. The input terminal of the amplifier 5 which is indicated by a plus sign (+) is connected to the output terminal of the amplifier 5 through the series connection of a resistor 8 and a capacitor 7. The plus sign at one of the input terminals of the amplifier indicates that the output voltage and the input voltage of the amplifier are in phase. If the series combination of the resistor 8 and the capacitor 7 is termed a complex resistance $Z_1$ and the parallel connection of the resistors 2 and 3 with the capacitors 4 and 6 is termed a complex resistance $Z_2$, we have:

$$U_e/U_a = Z_2/Z_1 + Z_2 = k,$$

where $U_e$ is the input alternating voltage and $U_a$ is the output alternating voltage required for the initiation of oscillation.

For the initiation of oscillation the self-excitation formula holds:

$$k \cdot V = 1$$

where $V$ is the amplification factor of the amplifier. If the impedance $Z_1$ is given a value from 1 to 2 k$\Omega$, with an operating resistance of the thermocouple circuit of from 10 to 20 ohms and an amplification factor of less than 10, undesirable starting of the oscillator and hence a false alarm may be prevented with a high degree of certainty. From the above the value of the permissible line capacitance and hence of the available length of the line may be deduced. With a capacitance of 50 nanofarad in both branches and when the resistance of the thermocouple circuit is raised to 1 k$\Omega$ (resistance 8 = 1 k$\Omega$) the frequency produced would be about 16 kHz according to the formula $f = 1/2 \pi \cdot R \cdot C$. Thus, the amplification factor required for the amplifier would be at least 3.

In the case of a cable capacitance of 150 pF/m and a parallel capacitance of 20 nF the permissible line length would be 250 m.

The said frequency of about 16 kHz is particularly advantageous since in this frequency range the voltage distribution over the line may still be considered to be stationary, i.e., the cable capacitance may be regarded as a lumped capacitance.

Designing the complex voltage divider so that it has an overall impedance of about from 1 to 2 k$\Omega$ is advantageous since it enables the available power of the amplifier to be maintained small.

Capacitive bias loading of the thermocouple circuit by the line capacitance 4 is appropriate to ensure that even in the case of a small cable length oscillation is initiated only at an appreciable increase in resistance.

Furthermore, it is advantageous to set the amplification factor of the amplifier 5 at a fixed value and to stabilise it against fluctuations of the temperature and the supply voltage by the provision of negative feedback.

The measuring converter, recording instrument and/or regulator 11 connected to the sensor line must have an input impedance for the frequency produced in the case of faults such as to enable a resistance increase in the thermocouple line to take effect.

In the case of rupture of the thermocouple the high-frequency alternating voltage produced is rectified and is available as a signal voltage of a few volts (direct voltage) at terminals 9 and 10. In the arrangement shown this signal voltage is applied through a large resistor to the input of the measuring converter, recording instrument and/or regulator 11 connected to the thermocouple circuit. This ensures that, depending on the polarity of the rectifier, the measuring device 11 is set either to the positive or to the negative final position so that, in the case of an indicator or a recording instrument, a visible signal is given and in the case of a control device the line controlled is switched out of the circuit.

I claim:

1. Apparatus for monitoring an electric element comprising, an amplifier, a plurality of resistors and capacitors, means connecting said resistors and capacitors in an RC network and in circuit with said element and said amplifier to form a Wien Bridge Oscillator which is arranged so as not to oscillate during normal operation of the electric element, said RC network determining the frequency of oscillation and the start of oscillation being determined by a change in the resistance value of said electric element when a defect occurs therein, and an indicating device controlled by the output voltage of the oscillator so as to indicate the occurrence of a defect in said electric element.

2. Apparatus as claimed in claim 1 wherein the resistors and capacitors of said RC network are chosen as to produce a frequency of oscillation of about 16 KHz upon the occurrence of a fault in said electric element.

3. Apparatus as claimed in claim 1 further comprising circuit means for providing an adjustable negative feedback for said amplifier.

4. Apparatus as claimed in claim 1 wherein said indicating device comprises a recording instrument connected in parallel with the input terminals of the amplifier and having a high input impedance.

5. Apparatus as claimed in claim 1 wherein said RC network includes a first branch of the bridge having a capacitor and resistance means connected in parallel to the input terminals of the amplifier, and wherein the resistance means includes said electric element.

6. Apparatus as claimed in claim 5 wherein said RC network further comprises a second branch of the bridge that includes a resistor and a second capacitor connected in series between an output terminal and an input terminal of the amplifier.

7. Apparatus as claimed in claim 6 wherein the input terminals of the indicating device are connected to the input terminals of the amplifier, and means providing a feedback path between an output terminal of the amplifier and an input terminal of the indicating device.

* * * * *